(12) United States Patent

Eriksson et al.

(10) Patent No.: US 9,867,079 B2
(45) Date of Patent: Jan. 9, 2018

(54) TRANSMITTING RADIO NODE, A RECEIVING RADIO NODE, AND METHODS THEREIN FOR HANDLING DATA PACKETS WITHIN A RADIO BEARER

(75) Inventors: Ann-Christine Eriksson, Enköping (SE); Paul Stjernholm, Lidingö (SE); Lotta Voigt, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 419 days.

(21) Appl. No.: 14/372,781

(22) PCT Filed: Jan. 26, 2012

(86) PCT No.: PCT/SE2012/050078
§ 371 (c)(1),
(2), (4) Date: Jul. 17, 2014

(87) PCT Pub. No.: WO2013/112084
PCT Pub. Date: Aug. 1, 2013

(65) Prior Publication Data
US 2015/0098332 A1    Apr. 9, 2015

(51) Int. Cl.
*H04W 28/02* (2009.01)
*H04L 12/801* (2013.01)
(Continued)

(52) U.S. Cl.
CPC ......... *H04W 28/0268* (2013.01); *H04L 47/14* (2013.01); *H04L 47/2441* (2013.01);
(Continued)

(58) Field of Classification Search
None
See application file for complete search history.

(56) References Cited

U.S. PATENT DOCUMENTS

| 2001/0006518 A1* | 7/2001 | Takabatake | ......... H04L 12/4011 |
| | | | 370/352 |
| 2005/0201353 A1* | 9/2005 | Lee | ....................... H04L 1/0018 |
| | | | 370/349 |

(Continued)

FOREIGN PATENT DOCUMENTS

| EP | 2 007 083 | 12/2008 |
| WO | WO 02/093968 | 11/2002 |

(Continued)

OTHER PUBLICATIONS

International Search Report for International Application No. PCT/SE2012/050078, dated Nov. 19, 2012.
(Continued)

*Primary Examiner* — Ayaz Sheikh
*Assistant Examiner* — Sori Aga
(74) *Attorney, Agent, or Firm* — Baker Botts, LLP

(57) ABSTRACT

Embodiments herein relate to a method in a transmitting radio node (12) for handling data packets within a radio bearer in a radio communications network (1). The transmitting radio node (12) sets up, within a radio bearer, a logical sub-channel for each of at least two identified packet flows. The transmitting radio node (12) associates an identity to each data packet of respective identified packet flow, where the identity is indicating the logical sub-channel of the respective identified traffic flow. The transmitting radio node (12) transfers the data packets of respective identified packet flow in an order over a channel in the radio communications network (1), where the order of transferring is based on the identity of each data packet.

26 Claims, 12 Drawing Sheets

(51) Int. Cl.
*H04L 12/851* (2013.01)
*H04W 72/10* (2009.01)

(52) U.S. Cl.
CPC ....... *H04W 28/0263* (2013.01); *H04W 72/10* (2013.01); *H04L 47/34* (2013.01)

(56) References Cited

U.S. PATENT DOCUMENTS

2007/0248075 A1* 10/2007 Liu ................... H04L 65/1016
370/349
2011/0058523 A1 3/2011 Manning et al.

FOREIGN PATENT DOCUMENTS

WO    WO 2006/071155    7/2006
WO    WO 2007/042874    4/2007

OTHER PUBLICATIONS

3rd Generation Partnership Project; Technical Specification Group Radio Access Network; Radio Link Control (RLC) protocol specification (Release 10), 2011.
3rd Generation Partnership Project; Technical Specification Group Radio Access Network.; High Speed Downlink Packet Access (HSDPA); Overall description; Stage 2 (Release 10), 2011.
3rd Generation Partnership Project; Technical Specification Group Radio Access Network; Medium Access Control (MAC) protocol specification (Release 10), 2011.
3rd Generation Partnership Project; Technical Specification Group Services and System Aspects; General Packet Radio Service (GPRS); Service description; Stage 2 (Release 10), 2011.

* cited by examiner

TRANSMITTING RADIO NODE, A RECEIVING RADIO NODE, AND METHODS THEREIN FOR HANDLING DATA PACKETS WITHIN A RADIO BEARER

PRIORITY

This nonprovisional application is a U.S. National Stage Filing under 35 U.S.C, §371 of International Patent Application Serial No. PCT/SE2012/050078, filed Jan. 26, 2012 and entitled "A Transmitting Radio Node, A Receiving Radio Node, and Methods Therein for Handling Data Packets Within A Radio Bearer."

TECHNICAL FIELD

Embodiments herein relate to a transmitting radio node, a receiving radio node and methods therein. In particular, embodiments herein relate to handle data packets within a radio bearer in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

In today's development of Third Generation Partnership Project (3GPP) wireless technologies, mentioned above, there are methods to differentiate end-user packet data services using Quality of Services definitions. The Quality of Service definitions may define a service priority, delay requirements, bit rate requirements, etc.

When an end-user of a user equipment initiates a packet data session accessing the radio communications network a connection is setup between a core network and the user equipment commonly denoted as one bearer service. Several packet data sessions may be carried by the same bearer service. The bearer service uniquely identifies packet flows, also referred to herein as traffic flows, that receive a common Quality of Service treatment between the user equipment and a gateway to the core network. In e.g. WCDMA networks a top bearer service is denoted as a Universal Mobile Telecommunications System (UMTS) Bearer defined by a Packet Data Protocol (PDP) context, while in a System Architecture Evolution (SAE)/LTE radio communications network a corresponding bearer service is denoted Evolved Packet System (EPS) Bearer.

Through a Radio Access Network (RAN) each bearer service is associated with one Radio Access Bearer (RAB), which is associated with one radio bearer. Herein we will use radio bearer as a general term for a bearer through the access network and comprises radio access bearer, a radio bearer, a Temporary Block Flow (TBF) or similar. For each radio access bearer or radio bearer the same Quality of Service is defined as for the bearer service. All traffic mapped to the same radio access bearer receive the same treatment for packet forwarding on a bearer level e.g. scheduling policy, queue management policy, rate shaping policy, Radio Link Control (RLC) configuration. A PDP Context/EPS bearer is mapped to one logical channel, a radio bearer, a radio access bearer or a temporary block flow for the different standards LTE, WCDMA and GSM.

The core network, e.g. a gateway node, may intercept traffic to perform packet inspection such as Deep Packet Inspection (DPI), flow identification, flow classification or likely, to detect different packet flows. The core network may then initiate the setup of additional radio bearers in order to separate different packet flows and to make it possible to differentiate the different packet flows on a service level by assigning different QoS to the different radio bearers based on the service of the different packet flows. But from a RAN perspective there is no guarantee that the process to differentiate the different packet flows on a radio bearer level actually is done in the core network. A drawback with the core network solution is that it requires multiple radio bearers to be set up, which introduces extra delay when setting up radio bearers in the radio communications network where the setup of radio bearers may be done in sequence. There are also limitations in the number of bearer combinations and number of parallel radio bearers supported by the user equipments and the radio communications network. This results in a reduced performance of the radio communications network.

SUMMARY

An object herein is to provide a mechanism to handle data packets within a radio bearer in an efficient manner to improve a performance of a radio communications network.

According to an aspect the object may be achieved by a method in a transmitting radio node for handling data packets within a radio bearer in a radio communications network. The transmitting radio node sets up, within a radio bearer, a logical sub-channel for each of at least two identified packet flows. The transmitting radio node furthermore associates an identity to each data packet of respective identified packet flow, where the identity is indicating the logical sub-channel of the respective identified traffic flow. The transmitting radio node transfers the data packets of respective identified packet flow in an order over a channel in the radio communications network. The order of transferring is based on the identity of each data packet.

According to another aspect the object may be achieved by a method in a receiving radio node for handling data packets within a radio bearer in a radio communications network. The receiving radio node receives, from the transmitting radio node, a data packet within the radio bearer. The receiving radio node further identifies a logical sub-channel within the radio bearer using an identity in the data packet. The data packet has a sequence number related to the logical sub-channel. The receiving radio node handles the data packet of the logical sub-channel using the identity and in accordance with the sequence number.

According to yet another aspect the object may be achieved by a transmitting radio node for handling data packets within the radio bearer in the radio communications network. The transmitting radio node comprises a configuring circuit configured to set up, within the radio bearer, the logical sub-channel for each of at least two identified packet flows. The transmitting radio node further comprises an associating circuit configured to associate an identity to each data packet of respective identified packet flow, where the identity is indicating the logical sub-channel of the respective identified traffic flow. The transmitting radio node also comprises a transferring circuit configured to transfer the data packets of respective identified packet flow in an order over a channel in the radio communications network. The order of transferring is based on the identity of each data packet.

According to still another aspect the object may be achieved by a receiving radio node for handling data packets within the radio bearer in the radio communications network. The receiving radio node comprises a receiving circuit configured to receive, from a transmitting radio node, a data packet within the radio bearer. The receiving radio node further comprises an identifying circuit configured to identify the logical sub-channel within the radio bearer using the identity in the data packet. The data packet has the sequence number related to the logical sub-channel. The receiving radio node also comprises a handling circuit configured to handle the data packet of the logical sub-channel using the identity and in accordance with the sequence number.

Thus, the packet flows may be treated differently based on e.g. service quality requirements over e.g. a radio interface, within a radio access network resulting in a better performance of the radio communications network.

BRIEF DESCRIPTION OF THE DRAWINGS

Embodiments will now be described in more detail in relation to the enclosed drawings, in which.

DETAILED DESCRIPTION

Figure 1:
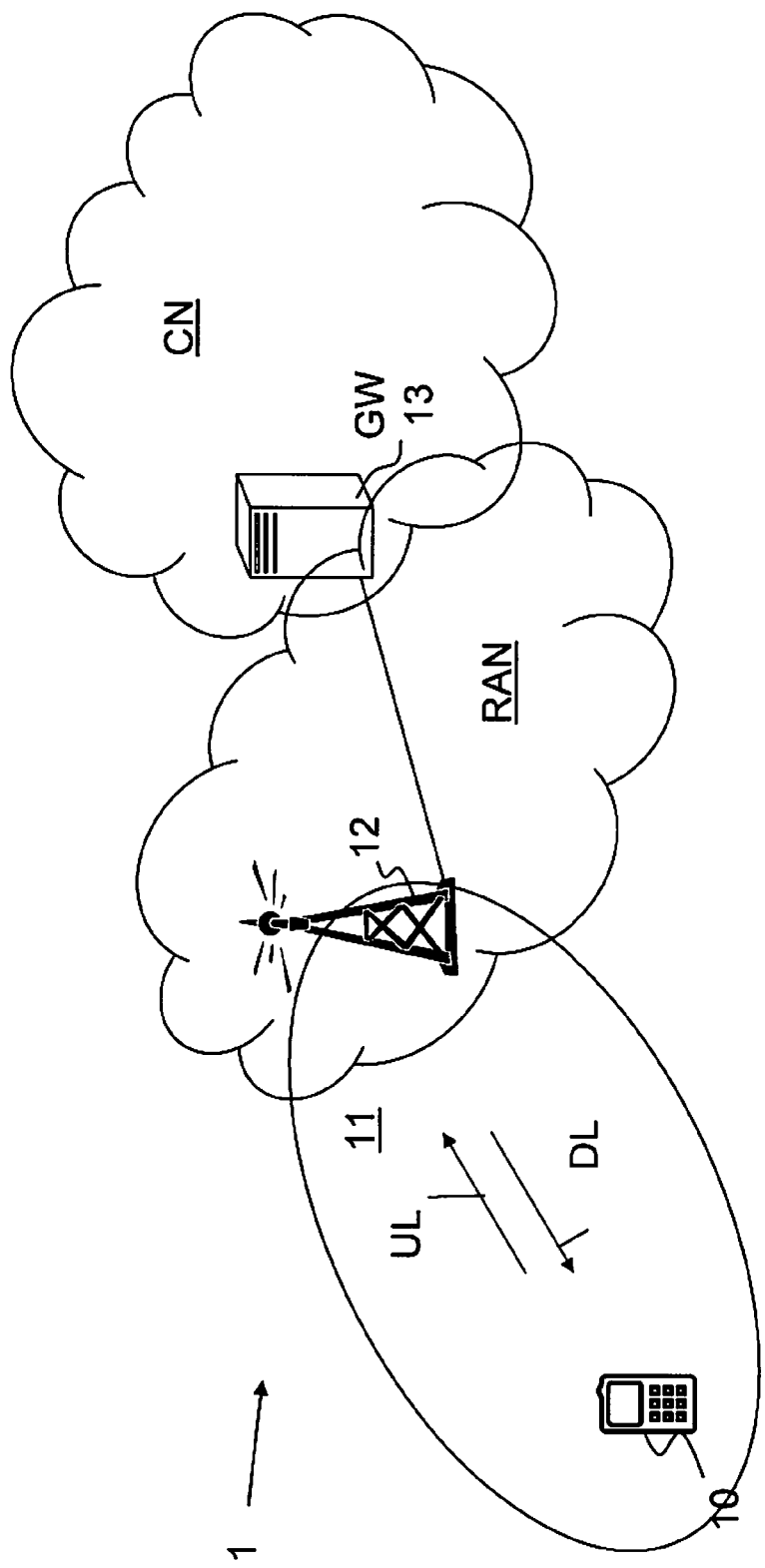
FIG. 1 is a schematic overview depicting a radio communications network according to embodiments herein.

FIG. 1 is a schematic overview depicting a radio communications network 1 according to some embodiments herein. The radio communications network 1 may be an LTE-advanced network, a LTE network, Universal Terrestrial Radio Access Network (UTRAN)-General Packet Radio Service (GPRS) network, a WCDMA network, a Code Division Multiple Access (CDMA) 2000 network, an Interim Standard 95 (IS-95) network, a Digital-Advanced Mobile Phone Service (D-AMPS) network etc. The radio communications network 1 comprises a transmitting radio node 12 exemplified in FIG. 1 as a radio base station in a Radio Access Network (RAN). The RAN provides access to a gateway node 13 in a Core Network (CN). The radio network node 12 serves or controls radio resources over a geographical area forming a cell 11. A receiving radio node 10 is served in the cell 11 by the radio network node 12. The transmitting radio node 12 and also the receiving radio node 10 may be any node communicating over a radio interface and in the radio access network (RAN), such as a user equipment or a RAN node, e.g. a radio network controller (RNC), a radio access node, a radio base station, a relay node, a beacon station or similar. In some embodiments herein this means that the transmitting radio node 12 may be a user equipment and the receiving radio node 10 may be the radio base station or the RNC (not shown). Furthermore, the receiving radio node 10 as well as the transmitting radio node 12 is illustrated as a single physical entity but it should be understood that the receiving radio node 10 and/or the transmitting radio node 12 may comprise a plurality of physical entities.

It should further be understood that a radio base station may also be referred to as e.g. a NodeB, an evolved Node B (eNB, eNode B), a base transceiver station, an Access Point Base Station, a base station router, or any other network unit capable to communicate with a user equipment within the cells served by the radio base station depending e.g. of the radio access technology and terminology used. The user equipment may be any wireless terminal, device or node e.g. Personal Digital Assistant (PDA), laptop, mobile, sensor, relay, mobile tablets or even a small base station communicating within respective cell. Furthermore, the term RNC should here not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realised in the Base Station Controllers (BSC) of the CDMA 2000 network.

The transmitting radio node 12 may receive a data flow, such as data packets of packet flows of different services, within a radio bearer intended for the receiving radio node 10. By separating the packet flows within the radio bearer into a number of logical sub-channels e.g. based on type of services, a new flow level is added within the radio bearer/logical channel level in the RAN on which the packet forwarding treatment, e.g. scheduling policy, queue management policy, rate shaping policy, is made.

Thus, embodiments herein provide methods to set up a logical sub-channel for each of at least two identified packet flows. The packet flow may comprise downlink data intended for the receiving radio node 10 or may comprise feedback data from the receiving radio node 10. It should further be understood that the packet flow may comprise uplink user data in the case where the receiving radio node 10 is a radio base station and the transmitting radio node 12 is a user equipment. The packet flows are associated with a logical sub-channel by associating or adding an identity to each data packet of respective identified packet flow. The data packet may be comprised in the identified packet flow, but in the case where the packet flow is a flow of feed back data packets, i.e. Acknowledgements (ACK) and/or non-Acknowledgements (NACK), the data packets are associated to the feed-back data packets such as being of a same or similar service of the acknowledged packet flow. The identity is indicating the logical sub-channel of the respective identified packet flow. Then, the data packets of respective identified packet flow are transferred in an order over a channel in the radio communications network 1. The order of transferring is taking the logical sub channel of the data packets into account and is thus based on the identity of each data packet. There may be multiple logical sub-channels per radio bearer, which may be added and removed during a lifetime of the radio bearer. A set of service quality parameters, assigned to each logical sub-channel, may determine the RAN treatment of the packet flows on the logical sub-channel. Hence, different packet flows may be handled differently within the RAN.

Embodiments herein provide methods to separate different packet flows within one radio bearer in the downlink, from the radio access network to the user equipment, and the uplink, from the end-user equipment to the radio access network, into so called logical sub-channels. Embodiments may also deal with how to assign service quality requirements per each Logical Sub-channel, including one or a group of packet flows. The service quality requirements are used such that the Logical Sub-channels may be treated individually. Thus, the transmitting radio node 12 and the receiving radio node 12 may be made aware of type of service of packets communicated within the radio communications network, thus, enabling a service awareness in the RAN. Internet services are likely to be mixed on a same bearer, such as a radio bearer or RAB, even though they may have very different quality requirements. The radio bearer of prior are is in most cases a best effort or low priority interactive bearer, giving all packet flows on this bearer the same QoS, irrespective of their need for specific QoS treatment. With multiple packet flows on the same radio bearer embodiments herein differentiate between the multiple different packet flows.

Figure 2:
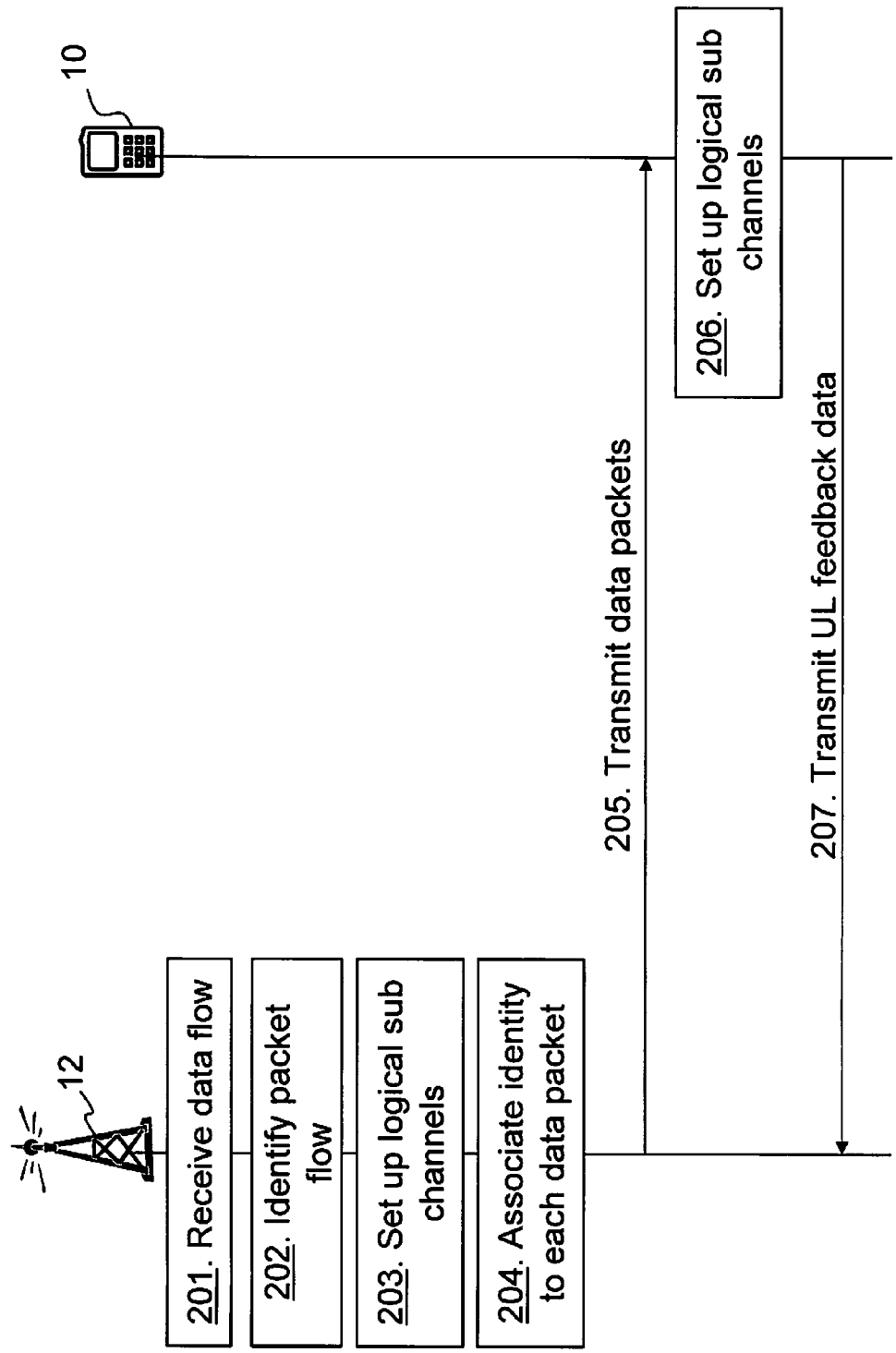
FIG. 2 is a combined flowchart and signalling scheme according to some embodiments herein.

FIG. 2 is a schematic combined flowchart and signalling scheme according to embodiments herein. In this example the transmitting radio node 12 is exemplified as a radio base station and the receiving radio node 10 is exemplified as a user equipment. However, as stated above the transmitting radio node 12 may be a user equipment and the receiving radio node 10 may be a radio base station.

Action 201.

The transmitting radio node 12 receives a data flow in a radio bearer to the receiving radio node 10. The data flow is intended for the receiving radio node 10. It should be noted that the data flow may come alternatively or additionally from the receiving radio node 10 e.g. as ACKs/NACKs of packets of a service.

Action 202.

The transmitting radio node 12 may identify the different packet flows of e.g. different service quality requirements within the radio bearer by, for example, by packet inspection such as Deep Packet Inspection (DPI). It should be understood that the transmitting radio node 12 may perform packet inspection on both downlink packet flows, i.e. data packets to the receiving radio node 10, and on uplink packet flows, data packets from the receiving radio node 10 to the transmitting radio node 12.

Action 203.

According to embodiments herein, the transmitting radio node 12 then sets up a logical sub-channel for each packet flow of e.g. different service quality requirement. Thus, when a new packet flow, requiring e.g. a QoS different from the QoS of the other packet flows on the bearer, is identified, a new logical sub-channel with its associated radio protocol entity is initiated for this flow. Such radio protocols may be a Packet Data Convergence Protocol (PDCP), RLC protocol, or Medium Access Control (MAC) protocol. Packet flows, i.e. transferred data packets associated with different services, with the same service quality requirements may be carried by the same logical sub-channel. Only packet flows with different service quality requirements are meaningful to separate to achieve differentiated handling of data packets of different services, but it is possible to separate all identified packet flows on a radio bearer by this method. Thus, one radio bearer/logical channel will be associated with multiple logical sub-channels on e.g. RLC layer.

Action 204.

The transmitting radio node 12 associates, e.g. by adding, an identity, also referred to as logical sub-channel identity, to each data packet of respective packet flow. To identify the logical sub-channels, each e.g. RLC layer of the data packet is assigned an identity comprising a few bits. The identity is indicating the logical sub-channel of the respective identified packet flow. The identity may for example be added in an RLC header or signaled in another way between the transmitting radio node 12 and the receiving radio node 10, and within the RAN.

The identity may be combined with an associated service quality requirement, as described below, into one identity. The number of bits may thus be less if it is combined, than having identity and service quality requirement as separate bits. The number of bits constituting the identity and possibly the associated service quality requirement determines a maximum number of parallel logical sub-channels possible within a radio bearer and, thus, the maximum number of parallel service quality levels. Furthermore, the transmitting radio node 12 may add sequence number per logical sub-channel to each data packet of respective packet flow.

Action 205.

The transmitting radio node 12 transfers the data packets by transmitting the data packets of respective identified packet flow in an order over the channel in the radio communications network 1 to the receiving radio node 10. The order of transferring, also referred to as transferring order, is based on the identity of each data packet and, if sequentially numbered, on the sequence numbers of the data packets.

Action 206.

The receiving radio node 10 receives the data packets and initiates a set-up of corresponding logical sub-channel in a reverse direction with a same identity as received logical sub-channel. For example, the receiving radio node 10 sets up logical sub-channels for uplink data packets when received data packets, downlink data packets or feedback data packets, comprises identities in the radio protocol layer indicating logical sub-channels. Thus, when the receiving radio node 10 detects a new identity in data packets sent from the transmitting radio node 12, the receiving radio node 10 initiates a new logical sub-channel with e.g. a separate PDCP/RLC entity working on data packets with the same identity. The receiving radio node 10 may thus identify the new logical sub-channel by detecting the new logical sub-channel identity. The receiving radio node 10 may then initiate a logical sub-channel in a reverse direction of a direction of the received data packets. For example, when initiating the logical sub-channel in downlink a corresponding logical sub-channel may be initiated in uplink in the receiving radio node 10, onto which the corresponding traffic flows are mapped. The in-sequence-delivery and acknowledgements of data packets are maintained within each logical sub-channel. Additionally or alternatively, when initiating the logical sub-channel in uplink a corresponding logical sub-channel may be initiated in downlink in the receiving radio node 10, in the example when user equipment is the transmitting radio node 12 and the radio base station is the receiving radio node 10.

Action 207.

The receiving radio node 10 communicates data packets e.g. transmits data packets of uplink data in the example when the receiving radio node 10 is a user equipment, adding identities at a radio protocol layer to the data packets indicating corresponding logical sub-channel. Thus, the receiving radio node 10 identifies the new logical sub-channel by detecting the new logical sub-channel identity. The receiving radio node 10 initiates a logical sub-channel. Hence, when initiating a logical sub-channel in one direction, a corresponding logical sub-channel may be initiated in the reverse direction in the receiving radio node 10, onto which the corresponding packet flows are mapped. Corresponding logical sub-channel herein means a logical sub-channel with a same service quality requirement.

By this method a new packet flow level is added within the radio bearer or logical channel level in the radio access network on which the packet forwarding treatment, e.g. scheduling policy, queue management policy, rate shaping policy, is made. This will be discussed below in relation to FIG. 5.

Embodiments herein allow the RAN to give Internet Services on a common radio bearer different traffic forwarding treatment in downlink, e.g. scheduling policy, queue management policy, rate shaping policy or similar. In prior art it is not possible to have service differentiation in the RAN unless the services are carried on separate radio bearers. According to embodiments herein with multiple logical sub-channels mapped to one radio bearer it will be possible to differentiate between a multitude of services, carried on the same bearer. Embodiments herein make it possible to assign different QoS to different packet flows without setting up new radio bearers. The core network and the RAN may be provided by different suppliers, and there is therefore in current system no guarantee that the service differentiation is actually done in the core network, why the RAN has to be service aware as in embodiments herein. Some embodiments offer increased flexibility and increased granularity of service differentiation possible in the RAN. It enables the RAN itself to offer a service aware packet forwarding treatment. And by avoiding the setup of new radio bearers per packet flow there is no or only a minimum of delay added to the connection set up phase as well as when adding or deleting a traffic flow. Also, the signalling load in the core network and in the RAN is decreased.

Figure 3:
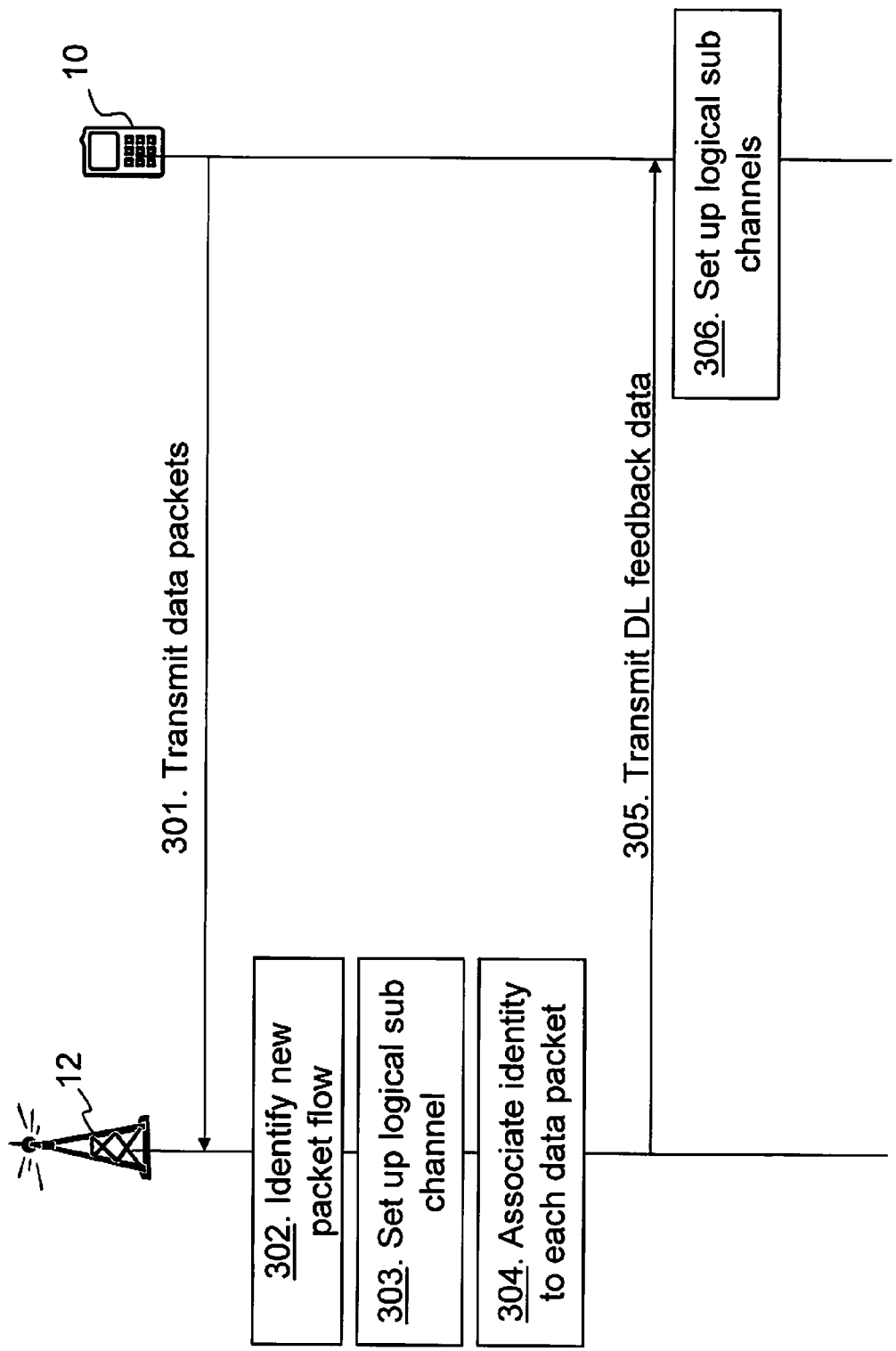
FIG. 3 is a combined flowchart and signalling scheme according to some embodiments herein.

FIG. 3 is a schematic combined flowchart and signalling scheme depicting some embodiments where the transmitting radio node 12 sets up logical sub-channels based on packets from the receiving radio node 10. In the illustrated example, the transmitting radio node 12 is a radio base station that receives uplink packet from the receiving radio node 10 exemplified as a user equipment.

Action 301.

The receiving radio node 10 transmits data packets in a packet flow to the transmitting radio node 12.

Action 302.

The transmitting radio node 12 identifies a new packet flow within the packet flow e.g. by performing packet inspection.

Action 303.

According to embodiments herein, the transmitting radio node 12 then sets up a logical sub-channel for the new packet flow of e.g. a different service quality requirement.

Action 304.

The transmitting radio node 12 associates identity to each feed back data for each packet in the packet flow. The identity is indicating the logical sub-channel of the respective identified packet flow. For example, the transmitting radio node 12 transmits ACKs/NACKs or similar with identities indicating the logical sub-channels.

Action 305.

The transmitting radio node 12 then transfers, e.g. transmits, the feedback data to the receiving radio node 10.

Action 306.

The receiving radio node 10 identifies the new logical sub-channel by detecting the new identity in the feedback data. The receiving radio node 10 initiates, in the illustrated example, an uplink logical sub-channel accordingly.

Thus, when a new packet flow, requiring a QoS different from QoS of the other packet flows on the radio bearer, is identified by the transmitting radio node 12, a new logical sub-channel may be initiated by the transmitting radio node 12, e.g. in uplink and/or downlink. Indication of this new logical sub-channel may be made on return data packets, e.g. Transmission Control Protocol (TCP) acknowledgments, transmitted to the receiving radio node 10.

Figure 4:
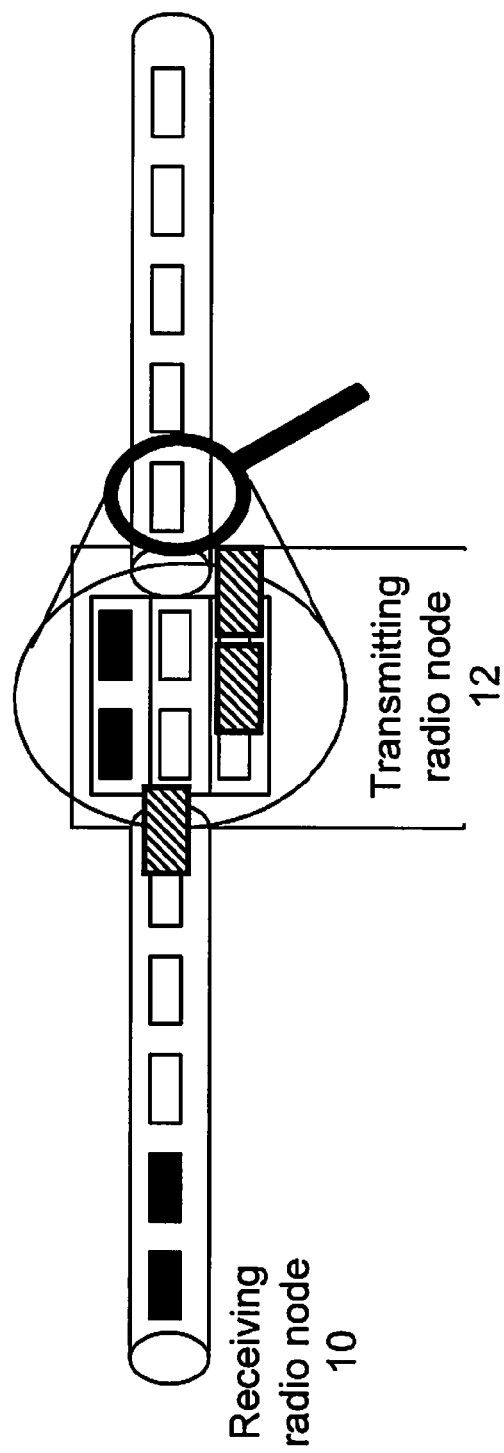
FIG. 4 is a block diagram depicting data packet handling according to some embodiments herein.

FIG. 4 is block diagram depicting a handling of a data flow according to some embodiments herein. The transmitting radio node 12 receives a data flow of data packets within a radio bearer intended for the receiving radio node 10. The data packets are parts of packet flows. The transmitting radio node 12 intercepts the data packets and identifies a number of packet flows of different service quality requirements. E.g. a first packet flow marked as white data packets, a second packet flow marked as diagonally striped data packets, and a third packet flow marked as black data packets. The transmitting radio node 12 then transfers the data packets according to set up logical sub-channels associated with respective identified packet flow. Thus, embodiments herein associate one or some packet flows, within a radio bearer, with the logical sub-channel based on e.g. service quality requirement. There may be multiple logical sub-channels per radio bearer, which may be added and removed during the lifetime of the radio bearer. A set of service quality (QoS) parameters, assigned to each logical sub-channel, determine the RAN treatment of the packet flows on the logical sub-channel.

Figure 5:
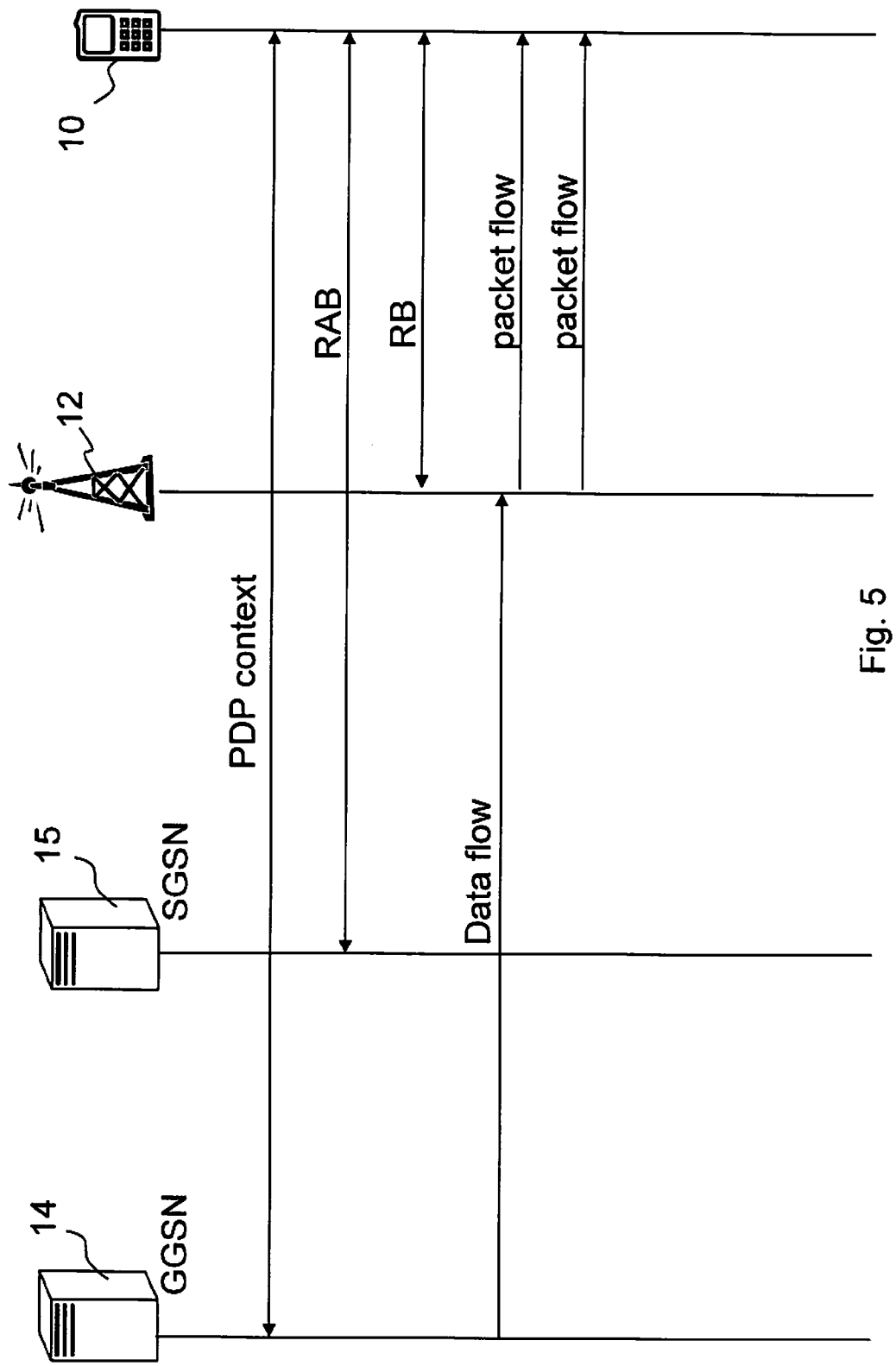
FIG. 5 is a schematic overview of bearers and packet flows according to some embodiments herein.

FIG. 5 is a schematic sequence diagram of bearers and flow initiation. Between a Gateway GPRS Support Node (GGSN) 14 and the receiving radio node 10, e.g. the UE, a Packet Data Protocol (PDP) context connection is setup. Between a Serving GPRS Support Node (SGSN) 16 and the receiving radio node 10 a Radio Access Bearer (RAB) is set up. Between the transmitting radio node 12 and the receiving radio node 10 a Radio Bearer (RB) is set up. The data flow may be received from the GGSN 14 within a RB and, according to embodiments described herein, the transmitting radio node 12 identifies the packets flows of the data flow and forwards the data packets based on service quality requirement of respective packet flow.

Figure 6:
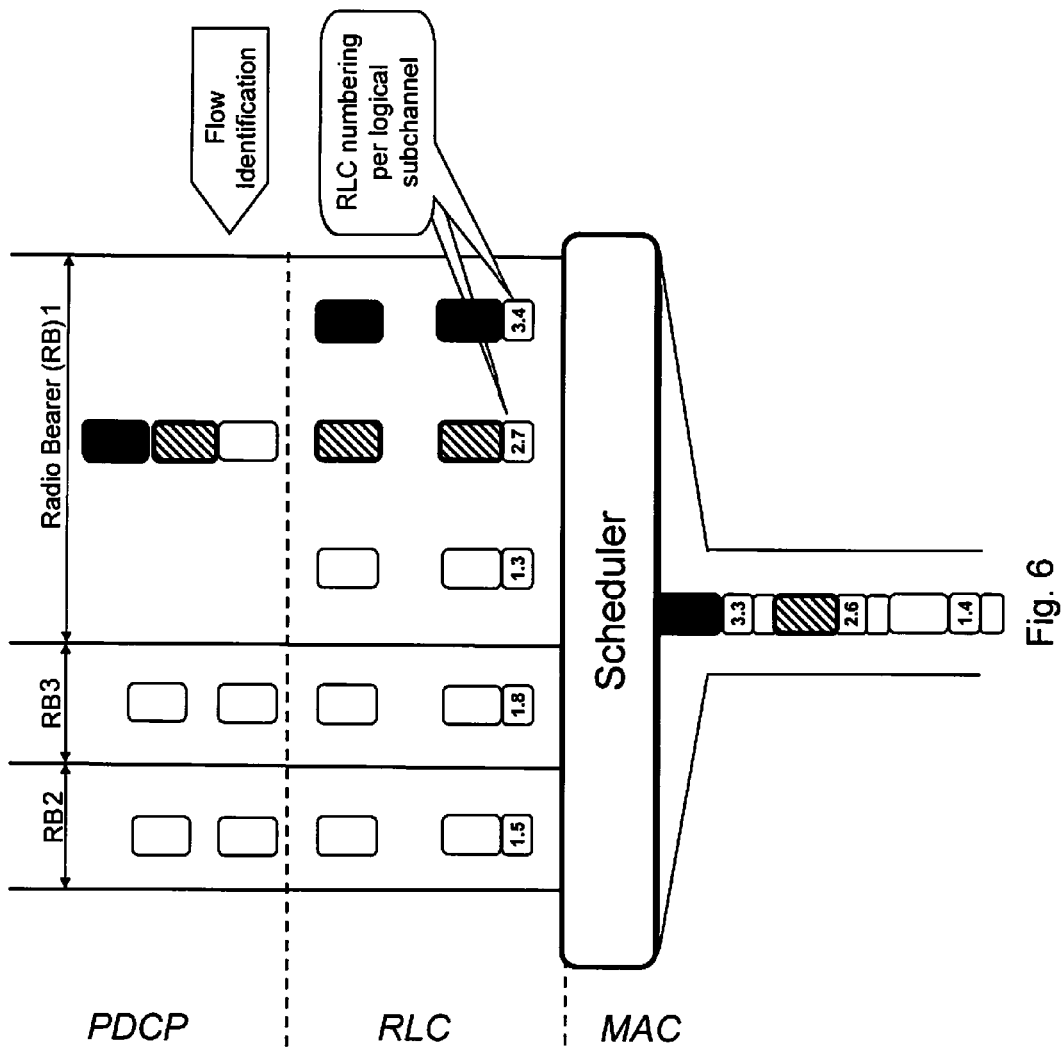
FIG. 6 is a block diagram depicting data packet handling according to some embodiments herein.

FIG. 6 is a block diagram depicting set up multiple logical sub-channels per radio bearer according to some embodiments herein. The transmitting radio node 12 identifies, at a Packet Data Convergence Protocol (PDCP) layer, a number of packet flows within a first radio bearer (RB1) to the receiving radio node 10. A first packet flow with identity 1 is marked as white data packets, a second packet flow with identity 2 is marked as diagonal striped data packets, and a third packet flow with identity 3 is marked as black data packets. The transmitting radio node 12 further receives data flows within a second radio bearer (RB2) and within a third radio bearer (RB3). The transmitting radio node 12 associates the data packets of identified packets flows with identities indicating service quality requirement. As shown in this example the service quality requirement of the data flows within the RB2 and RB3 are the same or similar as the first packet flow, i.e. all having identity 1. The data packets are also sequentially numbered, e.g. 2.7 which means logical sub-channel 2 and the seventh packet in the flow of the logical sub-channel. This identity and numbering may be referred to as RLC numbering per logical sub-channel. A scheduler of the transmitting radio node 12 then transmits the data packets taking the service quality requirement in terms of priority of respective packet flow into account by basing the order of transferring on the identity as the identity indicates the logical sub-channel of the respective identified traffic flow and thereby a priority order of the logical sub-channel queues. Furthermore, the scheduler transmits the data packets according to the sequence number of the data packets.

Figure 7:
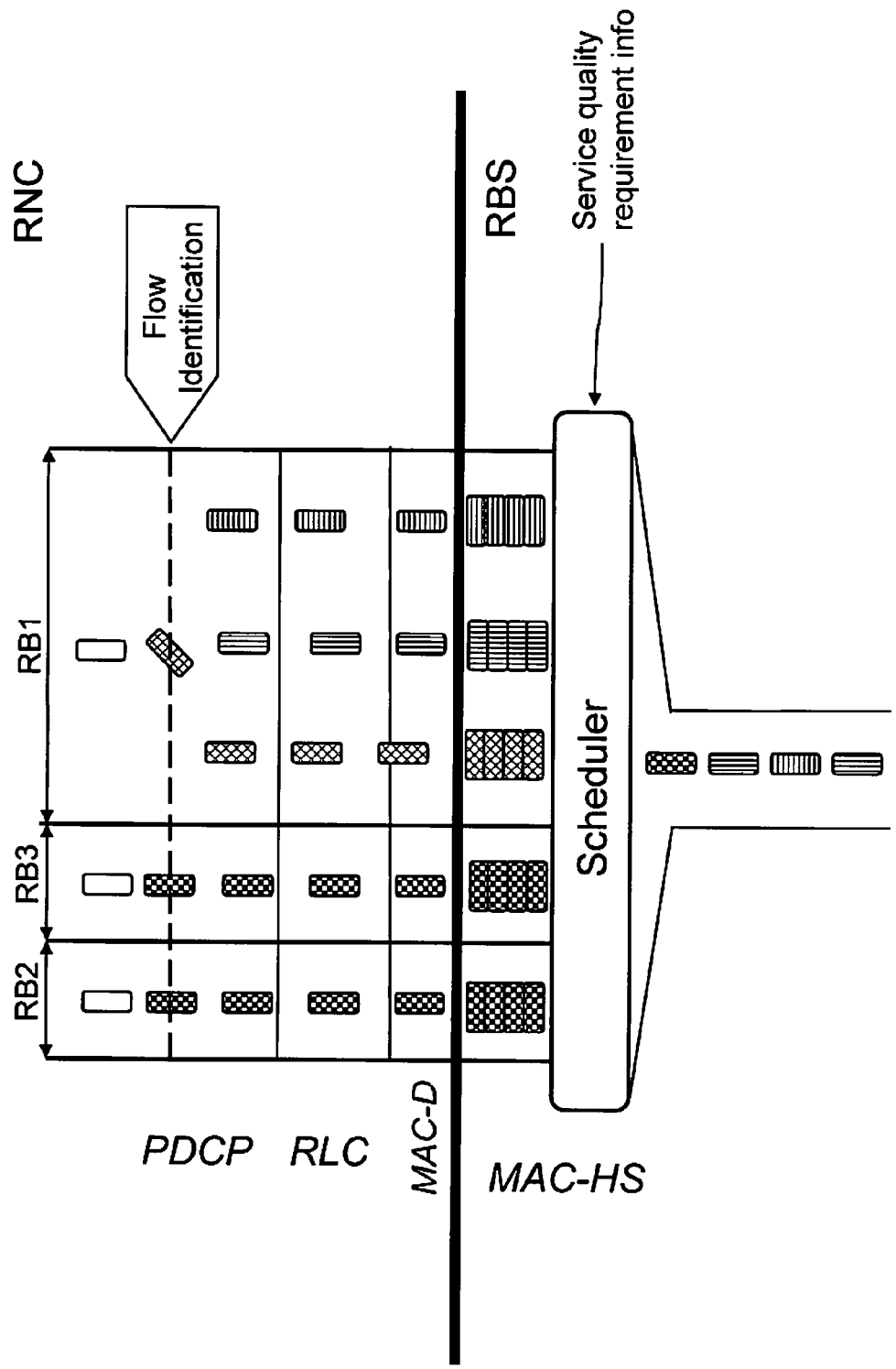
FIG. 7 is a block diagram depicting data packet handling according to some embodiments herein.

FIG. 7 is a block diagram depicting the set-up of logical sub-channel according to some embodiments. The transmitting radio node 12 in this example is an RNC. The transmitting radio node 12 identifies a number of packet flows within a first radio bearer (RB1), which data packets are marked as squared data packets, vertically striped data packets, and horizontally striped data packets to differentiate the different packet flows. Furthermore, the transmitting radio node 12 receives data flows over RB2 and RB3, which data packets are marked with a check pattern. The transmitting radio node 12 sets up a number of logical sub-channels for each identified packet flow at a PDCP layer, e.g. adding an identity indicating set up logical sub-channel of the data packet. The data packets are then transferred to, in this example, a radio base station (RBS), for scheduling over a radio interface towards the receiving radio node 10. The transmitting radio node 12 may further transmit service quality requirement information to a scheduler at the radio base station, such as priority information. The scheduler uses the service quality requirement associated with each logical sub-channel and the QoS associated with each radio bearer when scheduling packets to be transmitted and ensures the transmit order of packets within each logical sub-channel according to a sequence numbering at e.g. the RLC layer. A MAC-d entity at the transmitting radio node 12 has a connection to a MAC-hs entity at the radio base station. This connection is used to transfer data to the MAC-hs. As stated, the data packets within the all radio bearers, RB1-RB3, are then transmitted on a transport channel to the receiving radio node 10 of the radio bearer.

Figure 8:
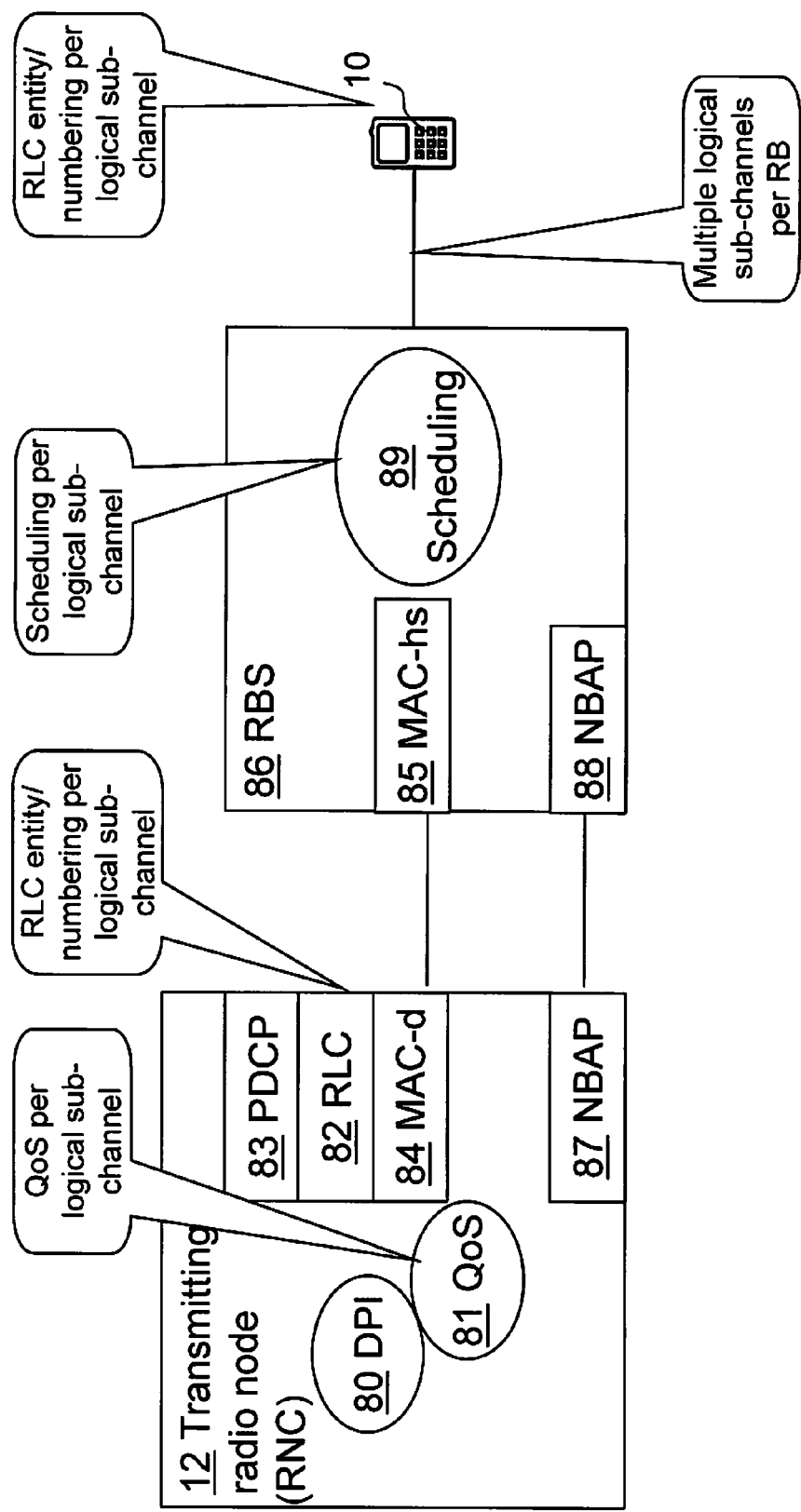
FIG. 8 is a block diagram depicting a radio communications network according to some embodiments herein.

FIG. 8 is a block diagram depicting the set-up of logical sub-channels in accordance with some embodiments herein. The transmitting radio node 12 is exemplified as an RNC in this example. The transmitting radio node 12 receives a data flow from the core network to be forwarded towards the receiving radio node 10, exemplified as a user equipment also in this example, within a radio bearer to the receiving radio node 10. The transmitting radio node 12 performs e.g. a deep packet inspection (DPI) 80 and identifies 81 a number of packet flows with different service quality requirements such as different QoS. The transmitting radio node 12 sets up a corresponding number of logical sub-channels for the identified packet flows. Thus, QoS per logical sub-channel is different. This may be done by associating or adding identities at a RLC layer in an RLC entity 82 or at a PDCP layer in an PDCP entity 83 of the data packets per logical sub-channel, which identity indicates the logical sub-channel. The data packets are also sequential numbered. As stated above, this may be referred to as PDCP or RLC numbering. The transmitting radio node 12 transfers the data packets with the identities to the radio base station using a MAC-d entity 84 to a MAC-hs entity 85 at a radio base station 86. The transmitting radio node 12 is connected to the radio base station 86 over a Node B Application Part (NBAP) connection from a NBAP entity 87 at the transmitting radio node 12 and another NBAP entity 88 over an Iub interface.

The radio base station 86 schedules 89 the data packets per logical sub-channel towards the receiving radio node 10. The data packets are transmitted to the receiving radio node 10 accordingly in multiple logical sub-channels per RB. The receiving radio node 10 receives the data packets and handles the data packets according to the identified logical sub-channels, based on the identity and the sequence numbers in an RLC entity at the receiving radio node 10. Thus, the logical sub-channels within the radio bearers are e.g. setup within the RAN, e.g. between the RAN nodes, and to the receiving radio node 10. This may be applied to for example WCDMA RAN where the PDCP and RLC entities, performing packet inspection and segmentation, are located in the RNC, while the MAC and scheduling entities, performing packet forwarding, are located in the radio base station, as shown. This allows differentiated traffic forwarding treatment per logical sub-channel in both downlink and uplink.

Figure 9:
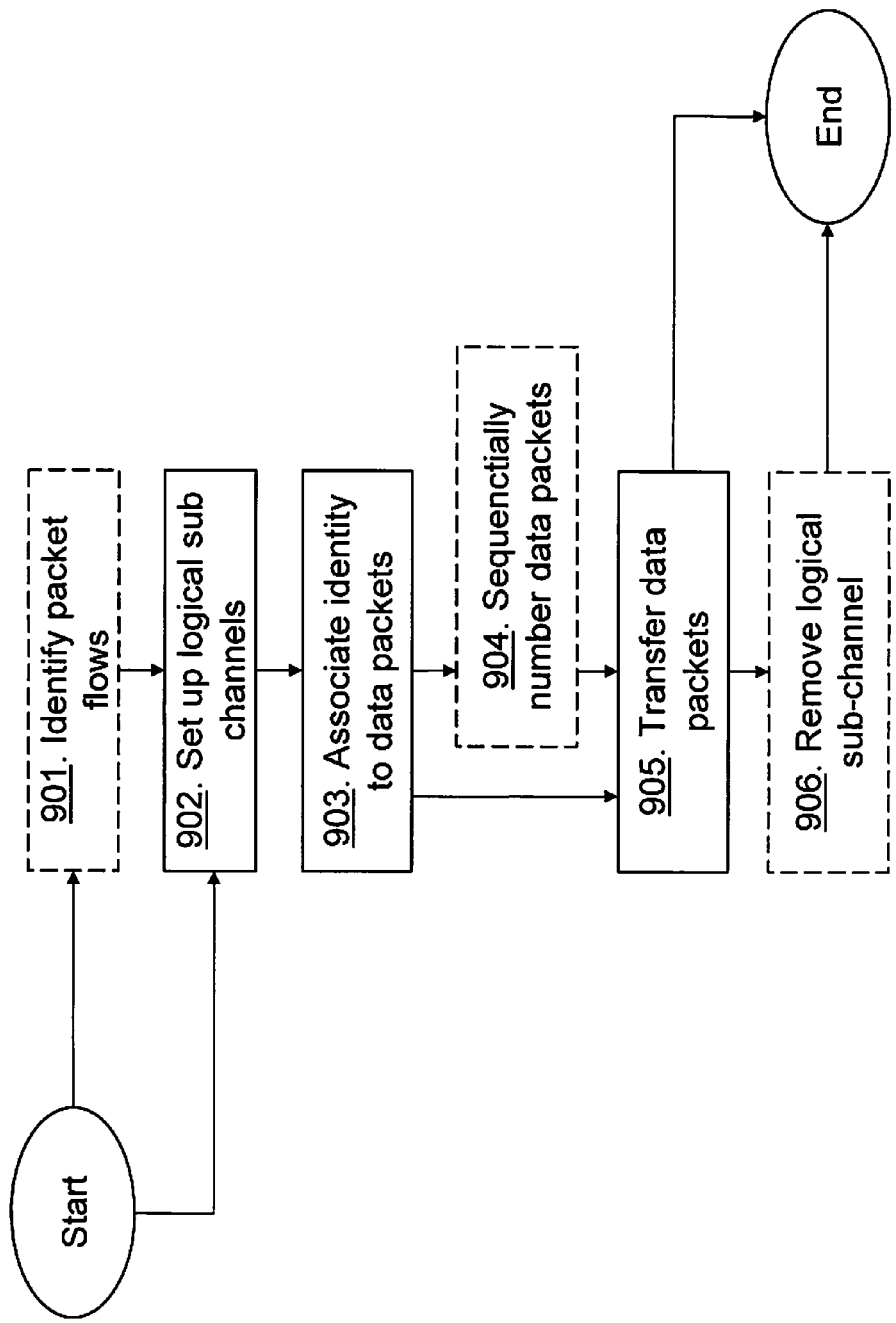
FIG. 9 is a flowchart depicting a method in a transmitting radio node according to some embodiments herein.

The method actions in the transmitting radio node 12 for handling data packets within the radio bearer in the radio communications network 1 according to some general embodiments will now be described with reference to a flowchart depicted in FIG. 9. The actions do not have to be taken in the order stated below, but may be taken in any suitable order. Actions performed in only some embodiments are marked with a dashed box.

Action 901.

The transmitting radio node identifies the at least two packet flows of data, where each packet flow is associated with a service quality requirement, which service quality requirement is different for respective packet flow. Different packet flows within a radio bearer may be identified by for example packet inspection in the RAN. The transmitting radio node 12 may perform this action on both downlink data flows, from the network to the UE, and on uplink traffic flows, from the UE to the network.

Action 902.

The transmitting radio node 12 sets up, within a radio bearer, a logical sub-channel for each of at least two identified packet flows. These packet flows may comprise data packets intended for the receiving radio node 10 but may also comprise data packets from the receiving radio node 10 indicating valid reception or not, also referred to as successfully reception or not, such as ACK or NACK. The packet flows, e.g. traffic flows of different services or ACK/NACK of different traffic flows, may be identified based on a quality of service requirement of the respective packet flow. The data packets may be uplink data packets, downlink data packets, user data packets, or feedback packets. In some embodiments the logical sub-channel may be set up at a Radio Link Control layer or at a Packet Data Convergence Protocol layer. In a radio protocol layer, the transmitting radio node 12 and the receiving radio node 10 exist as a pair and handle data transmission of the radio interface. The protocol layers may be divided into a first layer (L1), a second layer (L2), and a third layer (L3) based on the three lower layers of an open system interconnection (OSI) standard model. The first layer (L1), namely, the physical layer, provides data to the radio interface by using various radio transmission techniques. The physical layer is connected to an upper layer, called a medium access control (MAC) layer, via a transport channel. The transport channel is divided into a dedicated transport channel and a common transport channel depending on whether the channel is shared. A second layer (L2) includes a MAC layer, a radio link control (RLC) layer, and a packet data convergence protocol (PDCP) layer. The MAC layer maps various logical channels to various transport channels and also performs logical channel multiplexing for mapping several logical channels to one transport channel. The MAC layer is connected to an upper layer, called the radio link control (RLC) layer, via a logical channel. The logical channel is divided into a control channel for transmitting information of a control plane and a traffic channel for transmitting information of a user plane depending on a type of transmitted information.

Action 903.

The transmitting radio node 12 associates an identity to each data packet of respective identified packet flow. The identity is indicating the logical sub-channel of the respective identified traffic flow. In some embodiments each logical sub-channel has a separate service quality requirement associated with a service quality requirement of a corresponding packet flow out of the at least two identified packet flows. The identity of respective packet flow is then further associated with the separate service quality requirement of respective logical sub-channel. In some embodiments the separate service quality requirement is further associated with a set of service quality requirements or with a service quality requirement of the radio bearer. E.g. scheduling/transferring considering both logical sub-channel service quality requirement and radio bearer service quality requirements. In addition to service quality requirement parameters associated with the radio bearer, the logical sub-channels may be assigned a separate set of service quality requirement parameters, depending on the service quality requirements of the packet flow(s) carried on that logical sub-channel. The service quality requirement parameters, e.g. bit rate, service type and delay, are either based on information retrieved by packet inspection, e.g. packet inspection and classification, on the packet flow or configured in the transmitting radio node 12. The scheduling/transferring of data packets may be considering both logical sub-channel service quality requirement parameters and radio bearer service quality requirement, referred to as a combined service quality requirement.

Thus, based on the combined service quality requirement information associated with the radio bearer and with the logical sub-channel, the data packets transmitted within a logical sub-channel will thereby receive specific packet forwarding treatment, e.g. scheduling priority, policy or similar.

The identity may be radio protocol identity. For example, the transmitting radio node 12 may add the identity in a Radio Link Control header or in a Packet Data Convergence Protocol header of the data packet associated with respective identified traffic flow Action 904.

The transmitting radio node 12 may sequential number, per logical sub-channel, each data packet of respective identified packet flow by adding a sequence number to each data packet of respective packet flow. Then, the order of transferring is further based on the sequence numbers of the data packets. In order to allow for re-distributing the order of packets for the different logical sub-channels within a radio bearer the sequence numbering of each. e.g. RLC, data packet may be done within each separate logical sub-channel. Thus, there are multiple number sequences, one per logical sub-channel, per radio access bearer. This allows for in sequence delivery of RLC packets and acknowledgements to and from the receiving radio node 10 per logical sub-channel.

Action 905.

The transmitting radio node 12 then transfers the data packets of respective identified packet flow in an order over a channel in the radio communications network 1. The order of transferring is based on the identity of each data packet. In some embodiments the sequence number is transferred along with the data packet of respective identified packet flow. Transferring herein mean transferring internally within the transmitting radio node 12 or transmitting externally to the receiving radio node 10.

In some embodiments the transmitting radio node 12 may be represented by a radio network controller and the data packets of respective identified packet flow are transferred to a radio base station to be scheduled to a user equipment.

In some embodiments the transferring of the data packets is based on identity and another pre-set parameter. A prioritization of data from the receiving radio node 10, e.g. uplink data from a user equipment, may account for a logical sub-channel priority. When assigning grants to the receiving radio node 10 the scheduler in the transmitting radio node 12 may combine information from e.g. radio bearer QoS, a Data In Buffer (DIB) reported by e.g. the user equipment, and Logical Sub-Channel priority (LSCH), given by the logical sub-channel identity, e.g.

$$\text{UE grant} = F(\text{QoS}, \text{DIB}, \text{LSCH})$$

In e.g. WCDMA the logical sub-channel priority may be provided by e.g. a RNC to the scheduler in the transmitting radio node 12. A new information entity should then be added to appropriate radio link setup/configuration related messages on NBAP.

Action 906.

In some embodiments the transmitting radio node 12 removes the logical sub-channel for at least one packet flow out of the identified packet flows when no data packets with the service quality requirement of the at least one packet flow has been communicated over a period of time. Thus, embodiments herein provide a method that dynamically changes the number of logical sub-channels, i.e. logical sub-channels may be added and/or removed. For example, when a service on the radio bearer is no longer used, e.g. the data packets cease to arrive; the corresponding logical sub-channel may be taken down. This may be detected by inactivity supervision of the packet flow on the logical sub-channel or by some other method.

The time out to be used to determine logical sub-channel inactivity needs to be set in both the transmitting radio node 12 and the receiving radio node 10. The time out may be signalled to the receiving radio node 10 at radio bearer establishment/reconfiguration. A new information entity in the corresponding Radio Resource Control (RRC) messages may be introduced.

Figure 10:
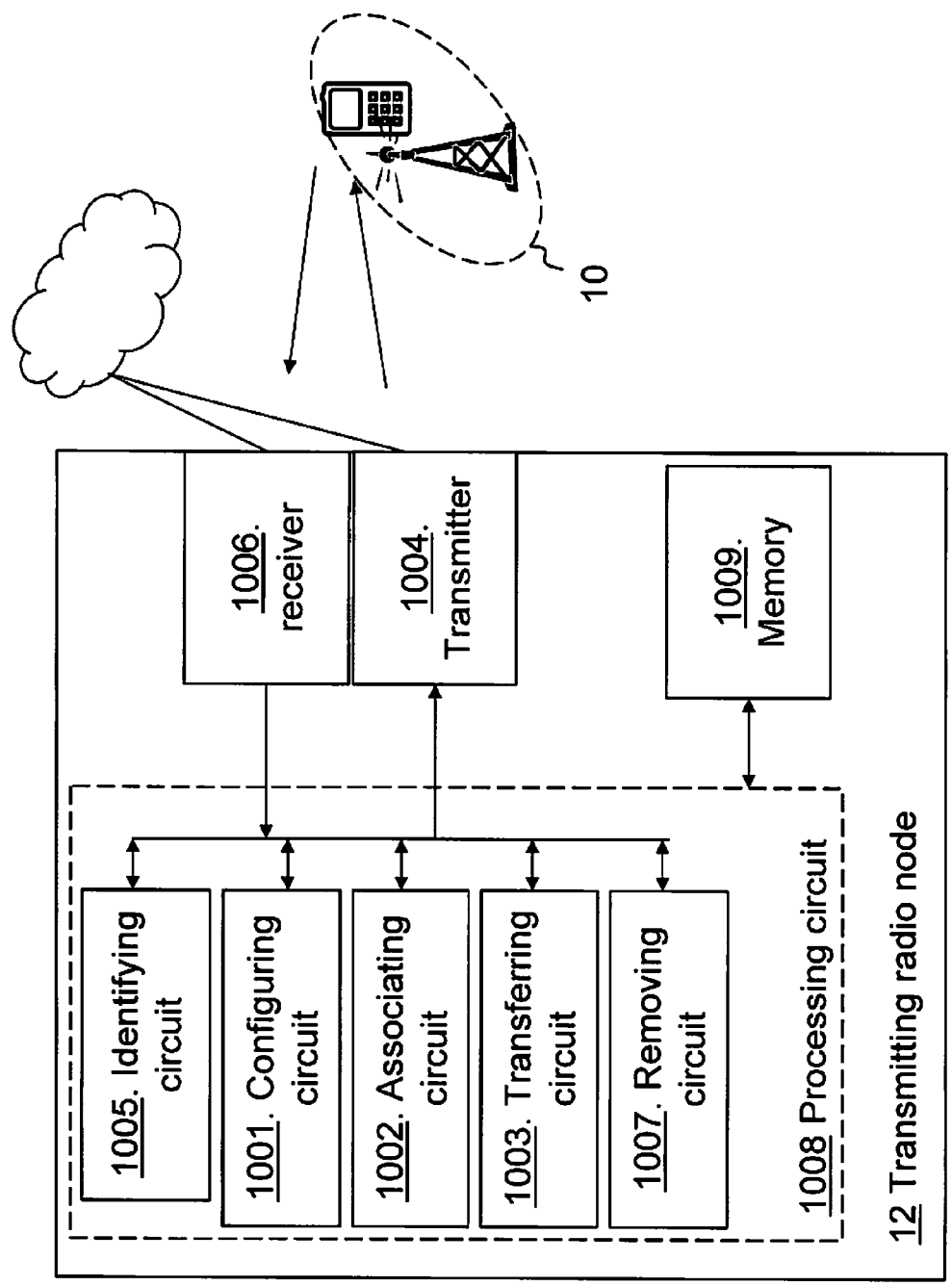
FIG. 10 is a block diagram depicting a transmitting radio node according to some embodiments herein.

FIG. 10 is a block diagram depicting the transmitting radio node 12 for handling data packets within the radio bearer in the radio communications network 1.

The transmitting radio node 12 comprises a configuring circuit 1001 configured to set up, within the radio bearer, the logical sub-channel for each of at least two identified packet flows. In some embodiments, the configuring circuit 1001 is further configured to set up the logical sub-channel at a Radio Link Control layer or at a Packet Data Convergence Protocol layer.

The transmitting radio node 12 further comprises an associating circuit 1002 configured to associate the identity to each data packet of respective identified packet flow. The identity is indicating the logical sub-channel of the respective identified traffic flow.

The configuring circuit 1001 may further be configured to set up the logical sub-channels so that each logical sub-channel has a separate service quality requirement associated with a service quality requirement of a corresponding packet flow out of the at least two identified packet flows. The associating circuit 1002 may be configured to associate the identity. The identity of respective packet flow is further associated with the separate service quality requirement of respective logical sub-channel. The separate service quality requirement may further be associated with a set of service quality requirements or with a service quality requirement of the radio bearer.

The transmitting radio node 12 additionally comprises a transferring circuit 1003 configured to transfer the data packets of respective identified packet flow in the order over the channel in the radio communications network 1. The order of transferring is based on the identity of each data packet. In some embodiments the data packets are transferred via a transmitter 1004 comprised in the transmitting radio node 12. The associating circuit 1002 may in some embodiments be configured to sequentially number per logical sub-channel each data packet of respective identified packet flow by adding a sequence number to each data packet of respective packet flow. The order of transferring may then further be based on the sequence numbers of the data packets. The transferring circuit 903 may further be configured to transfer the sequence number along with the data packet of respective identified packet flow. In some embodiments the transmitting radio node 12 is represented by a radio network controller and the transferring circuit 1003 is configured to transfer the data packets of respective identified packet flow to a radio access node to be scheduled to a user equipment.

The transmitting radio node 12 may further comprise an identifying circuit 1005 configured to identify the at least two packet flows, where each packet flow is associated with a service quality requirement. The service quality requirement is different for respective packet flow. The data flow may be received over a receiver 1006 comprised in the transmitting radio node 12.

In some embodiments the transmitting radio node 12 comprises a removing circuit 1007 configured to remove the logical sub-channel for at least one packet flow out of the identified packet flows when no data packets with the service quality requirement of the at least one packet flow has been communicated over a period of time.

Figure 11:
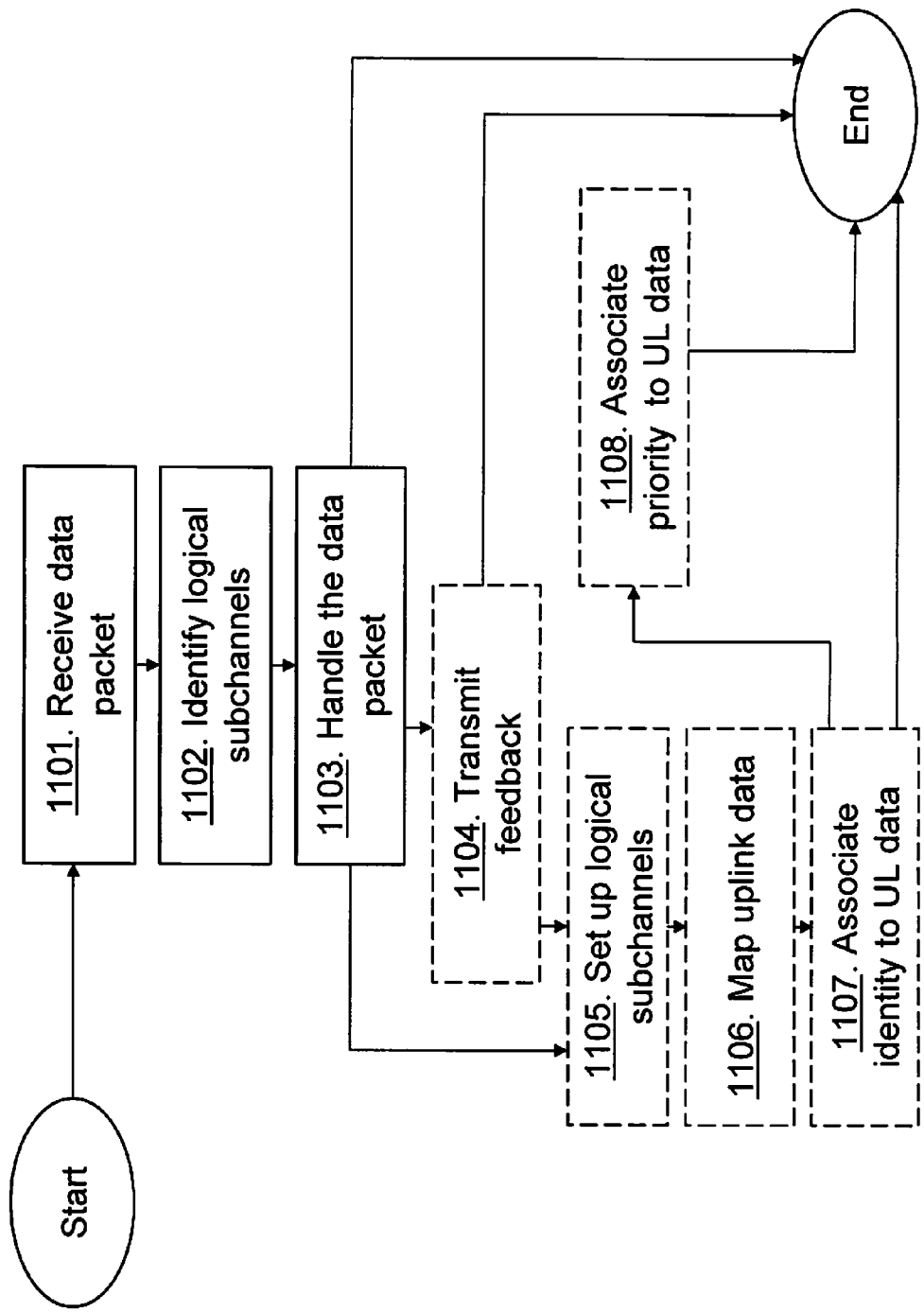
FIG. 11 is a flowchart depicting a method in a receiving radio node according to some embodiments herein.

The embodiments herein for handling data packets within the radio bearer in the radio communications network 1 may be implemented through one or more processors, such as a processing circuit 1008 in the transmitting radio node depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the transmitting radio node 12. One such carrier may be in the form of a CD ROM disc. It is however feasible with other data carriers such as a memory stick. The computer program code may furthermore be provided as pure program code on a server and downloaded to the transmitting radio node 12.

The transmitting radio node 12 may further comprise a memory 1009 to be used to store data on, such as service quality requirements, data packets, identities, sequential numbers, application to perform the methods herein, and/or similar. The memory 1009 may comprise one or more memory units.

The method actions in the receiving radio node 10 for handling data packets within the radio bearer in the radio communications network 1 according to some general embodiments will now be described with reference to a flowchart depicted in FIG. 11. The actions do not have to be taken in the order stated below, but may be taken in any suitable order.

Action 1101.

The receiving radio node 10 receives from a transmitting radio node 12, a data packet within a radio bearer.

Action 1102.

The receiving radio node 10 identifies a logical sub-channel within the radio bearer using an identity in the data packet, and wherein the data packet has a sequence number related to the logical sub-channel.

Action 1103.

The receiving radio node 10 handles the data packet of the logical sub-channel using the identity and in accordance with the sequence number. The identity may be assigned at a Radio Link Control layer or at a Packet Data Convergence Protocol layer in the data packet.

Action 1104.

The receiving radio node 10 may transmit feedback data to the transmitting radio node 12 indicating whether any of the received data packets has been successfully received based on the identified data packet taking the identity and the sequence number of the identified data packet into account. For example, the receiving radio node 10 may do this when a packet is received out of sequence of an identified logical sub-channel or when a data packet is missing.

Action 1105.

The receiving radio node 10 may set up a logical sub-channel for data to be transmitted in a reverse direction of a direction of the received data packets, which set up logical sub-channel corresponds to the logical sub-channel indicated by the identity of the identified data packet.

Action 1106.

The receiving radio node 10 may further map data to be transmitted onto the set up logical sub-channel, wherein e.g. packet inspection identifies the data to be transmitted in one reverse direction corresponding to data received on the logical sub-channel. The service quality requirement of the mapped data corresponds to the service quality requirement of the received data packet.

Action 1107.

The receiving radio node 10 may then associate an identity to a data packet of the mapped data, where the identity is indicating the logical sub-channel associated with a service quality requirement. The identity may be added to a header in the data.

Action 1108.

The receiving radio node 10 associates the data packet of the mapped data with a priority when scheduling transmission derived from an existing logical channel priority and a logical sub-channel priority.

The priority given to the logical sub-channel may be derived from the existing Logical Channel Priority (LCP) signalled by the network and a logical sub-channel priority implicitly described by the identity of the logical sub-channel. Thus, the number of bits used for the identity determines the service quality requirement differentiation possible between logical sub-channels of a radio bearer/logical channel.

The receiving radio node 10, being exemplified as a user equipment, may schedule traffic in uplink based on the combined priority derived from the Logical Channel Priority (LCP) and the logical sub-channel priority (LSCP), i.e.:

Uplink Scheduling Priority=$F$(LCP,LSCP)

A possible solution is to schedule data per Logical Channel in order of Priority (LCP) and within each logical channel schedule data in order of Priority per Logical Sub-Channel (LSCP)

Figure 12:
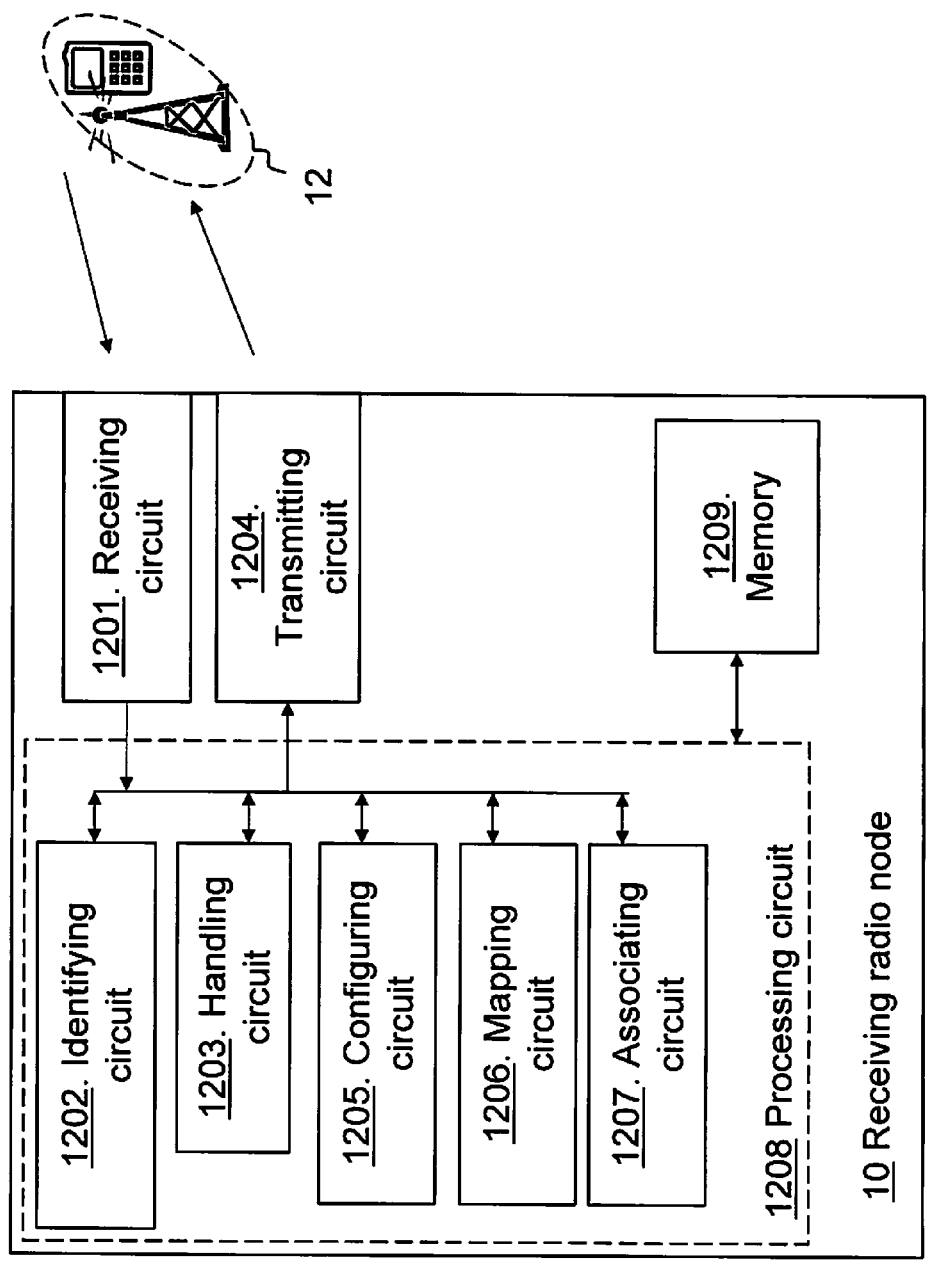
FIG. 12 is a block diagram depicting a receiving radio node according to some embodiments herein.

FIG. 12 is a block diagram depicting the receiving radio node 10 for handling data packets within a radio bearer in the radio communications network 1.

The receiving radio node 10 comprises a receiving circuit 1201 configured to receive, from the transmitting radio node 12, the data packet within the radio bearer.

The receiving radio node further comprises an identifying circuit 1202 configured to identify the logical sub-channel within the radio bearer using the identity in the data packet. Furthermore, the data packet has a sequence number related to the logical sub-channel. The identifying circuit 1202 may in some embodiments be configured to assign the identity at a Radio Link Control layer or at a Packet Data Convergence Protocol layer in the data packet.

The receiving radio node 10 further comprises a handling circuit 1203 configured to handle the data packet of the logical sub-channel using the identity and in accordance with the sequence number.

The receiving radio node 10 may further comprise a transmitting circuit 1204 that is configured to transmit feedback data to the transmitting radio node 12 indicating whether any of the received data packets has been successfully received based on the identified data packet taking the identity and the sequence number of the identified data packet into account.

The receiving radio node 10 may further comprise a configuring circuit 1205 arranged to set up a logical sub-channel for data to be transmitted in a reverse direction of a direction of the received data packet. The set up logical sub-channel corresponds to the logical sub-channel indicated by the identity of the identified data packet. The configuring circuit 1205 may be arranged to identify the data e.g. in uplink, corresponding to data received on the logical sub-channel in a reverse direction such as downlink.

The receiving radio node 10 may then further comprise a mapping circuit 1206 configured to map data to be transmitted onto the set up logical sub-channel. A service quality requirement of the mapped data corresponds to a service quality requirement of the received data packet.

The receiving radio node 10 may additionally comprise an associating circuit 1207 configured to associate an identity to a data packet of the mapped data. The identity is indicating the logical sub-channel associated with a service quality requirement. In some embodiments the associating circuit 1207 is further configured to give the data packet of the mapped data a priority when scheduling transmission derived from an existing logical channel priority and a logical sub-channel priority.

The embodiments herein for handling data packets within a radio bearer in the radio communications network 1 may be implemented through one or more processors, such as a processing circuit 1208 in the receiving radio node 10 depicted in FIG. 13, together with computer program code for performing the functions and/or method actions of the embodiments herein. The program code mentioned above may also be provided as a computer program product, for instance in the form of a data carrier carrying computer program code for performing embodiments herein when being loaded into the receiving radio node 10. One such carrier may be in the form of a CD ROM disc. It is however feasible with other data carriers such as a memory stick. The computer program code may furthermore be provided as pure program code on a server and downloaded to the receiving radio node 10.

The receiving radio node 10 may further comprise a memory 1209 to be used to store data on, such as service quality requirements, data packets, identities, sequential numbers, application to perform the methods herein, and/or similar. The memory 1209 may comprise one or more memory units.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a transmitting radio node for handling data packets within a radio bearer in a radio communications network, the method comprising:
    setting up, within a radio bearer, a logical sub-channel for each of at least two identified packet flows;
    associating an identity to each data packet of respective identified packet flow, of the at least two identified packet flows, carried within a Radio Link Control (RLC) entity, where the identity is indicating the logical sub-channel of the respective identified traffic flow;
    transferring the data packets of respective identified packet flow in an order over a channel in the radio communications network, where the order of transferring is based on the identity of each data packet; and
    removing the logical sub-channel for at least one packet flow out of the identified packet flows when a given period of time has passed in which no data packets with a service quality requirement of the at least one packet flow has been communicated.

2. A method according to claim 1, further comprising identifying the at least two packet flows of data, where each packet flow is associated with a service quality requirement, which service quality requirement is different for respective packet flow.

3. A method according to claim 1, where each logical sub-channel has a separate service quality requirement associated with a service quality requirement of a corresponding packet flow out of the at least two identified packet flows, and wherein the identity of respective packet flow is further associated with the separate service quality requirement of respective logical sub-channel.

4. A method according to claim 3, wherein the separate service quality requirement is further associated with a set of service quality requirements or with a service quality requirement of the radio bearer.

5. A method according to claim 1, further comprising sequentially numbering, per logical sub-channel, each data packet of respective identified packet flow by adding a sequence number to each data packet of respective packet flow, and the order of transferring is further based on the sequence numbers of the data packets.

6. A method according to claim 5, wherein transferring comprises to transfer the sequence number along with the data packet of respective identified packet flow.

7. A method according to claim 1, wherein the setting up comprises to set up the logical sub-channel at a RLC layer or at a Packet Data Convergence Protocol layer.

8. A method according to claim 1, wherein the transmitting radio node is represented by a radio network controller and the data packets of respective identified packet flow are transferred to a radio access node to be scheduled to a user equipment.

9. A method in a receiving radio node for handling data packets within a radio bearer in a radio communications network, the method comprising:
receiving, from a transmitting radio node, a data packet within a radio bearer;
identifying a logical sub-channel within the radio bearer using an identity in the data packet, and wherein the data packet has a sequence number related to the logical sub-channel, where the identity is indicating the logical sub-channel of a respective traffic flow of at least two identified packet flows carried within a Radio Link Control (RLC) entity;
handling the data packet of the logical sub-channel using the identity and in accordance with the sequence number;
setting up a logical sub-channel for data to be transmitted in a reverse direction of a direction of the received data packets, which set up logical sub-channel corresponds to the logical sub-channel indicated by the identity of the identified data packets; and
removing the logical sub-channel for data to be transmitted in the reverse direction when a given period of time has passed in which no data packets with a service quality requirement of the at least one packet flow has been communicated.

10. A method according to claim 9, wherein the identity is assigned at a RLC layer or at a Packet Data Convergence Protocol layer in the data packet.

11. A method according to claim 9, further comprising transmitting feedback data to the transmitting radio node indicating whether any of the received data packets has been successfully received based on the identified data packet taking the identity and the sequence number of the identified data packet into account.

12. A method according to claim 9, further comprising mapping data to be transmitted onto the set up logical sub-channel, wherein a service quality requirement of the mapped data corresponds to a service quality requirement of the received data packet, and associating an identity to a data packet of the mapped data, where the identity is indicating the logical sub-channel associated with a service quality requirement.

13. A method according to claim 12, further comprising:
associating the data packet of the mapped data with a priority when scheduling transmission derived from an existing logical channel priority and a logical sub-channel priority.

14. A transmitting radio node for handling data packets within a radio bearer in a radio communications network, comprising:
a configuring circuit configured to set up, within a radio bearer, a logical sub-channel for each of at least two identified packet flows;
an associating circuit configured to associate an identity to each data packet of respective identified packet flow, of the at least two identified packet flows, carried within a Radio Link Control (RLC) entity, where the identity is indicating the logical sub-channel of the respective identified traffic flow;
a transferring circuit configured to transfer the data packets of respective identified packet flow in an order over a channel in the radio communications network (1), where the order of transferring is based on the identity of each data packet; and
removing the logical sub-channel for at least one packet flow out of the identified packet flows when a given period of time has passed in which no data packets with a service quality requirement of the at least one packet flow has been communicated.

15. A transmitting radio node according to claim 14, further comprising:
an identifying circuit configured to identify the at least two packet flows, where each packet flow is associated with a service quality requirement, which service quality requirement is different for respective packet flow.

16. A transmitting radio node according to claim 14, wherein the configuring circuit is further configured to set up the logical sub-channels so that each logical sub-channel has a separate service quality requirement associated with a service quality requirement of a corresponding packet flow out of the at least two identified packet flows, and wherein the associating circuit is configured to associate the identity, wherein the identity of respective packet flow is further associated with the separate service quality requirement of respective logical sub-channel.

17. A transmitting radio node according to claim 16, wherein the separate service quality requirement is further associated with a set of service quality requirements or with a service quality requirement of the radio bearer.

18. A transmitting radio node according to claim 16, wherein the associating circuit is further configured to sequentially number per logical sub-channel each data packet of respective identified packet flow by adding a sequence number to each data packet of respective packet flow, and the order of transferring is further based on the sequence numbers of the data packets.

19. A transmitting radio node according to claim 18, wherein the transferring circuit is further configured to transfer the sequence number along with the data packet of respective identified packet flow.

20. A transmitting radio node according to claim 14, wherein the configuring circuit is further configured to set up the logical sub-channel at a RLC layer or at a Packet Data Convergence Protocol layer.

21. A transmitting radio node according to claim 14, wherein the transmitting radio node is represented by a radio network controller and the transferring circuit is configured to transfer the data packets of respective identified packet flow to a radio access node to be scheduled to a user equipment.

22. A receiving radio node for handling data packets within a radio bearer in a radio communications network, comprising:
- a receiving circuit configured to receive, from a transmitting radio node, a data packet within a radio bearer;
- an identifying circuit configured to identify a logical sub-channel within the radio bearer using an identity in the data packet, and wherein the data packet has a sequence number related to the logical sub-channel, wherein the identity is indicating the logical sub-channel of a respective traffic flow of at least two identified packet flows carried within a Radio Link Control (RLC) entity;
- a handling circuit configured to handle the data packet of the logical sub-channel using the identity and in accordance with the sequence number:
- setting up a logical sub-channel for data to be transmitted in a reverse direction of a direction of the received data packets, which set up logical sub-channel corresponds to the logical sub-channel indicated by the identity of the identified data packets; and
- removing the logical sub-channel for data to be transmitted in the reverse direction when a given period of time has passed in which no data packets with a service quality requirement of the at least one packet flow has been communicated.

23. A receiving radio node according to claim 22, wherein the identifying circuit is configured to assign the identity at a RLC layer or at a Packet Data Convergence Protocol layer in the data packet.

24. A receiving radio node according to claim 22, further comprising:
- a transmitting circuit configured to transmit feedback data to the transmitting radio node indicating whether any of the received data packets has been successfully received based on the identified data packet taking the identity and the sequence number of the identified data packet into account.

25. A receiving radio node according to claim 22, further comprising
- a mapping circuit configured to map data to be transmitted onto the set up logical sub-channel, wherein a service quality requirement of the mapped data corresponds to a service quality requirement of the received data packet, and
- an associating circuit configured to associate an identity to a data packet of the mapped data, where the identity is indicating the logical sub-channel associated with a service quality requirement.

26. A receiving radio node according to claim 25, wherein the associating circuit is further configured to give the data packet of the mapped data a priority when scheduling transmission derived from an existing logical channel priority and a logical sub-channel priority.

* * * * *